US009200914B2

(12) United States Patent
Solomon et al.

(10) Patent No.: US 9,200,914 B2
(45) Date of Patent: Dec. 1, 2015

(54) COMBINED OFFBOARD AND ONBOARD NAVIGATION SYSTEM AND METHOD

(75) Inventors: Aaron Solomon, Villejuif (FR); Julien Zarka, Vitry sur Seine (FR); Aude Quintana, Chevilly Larue (FR); Jean-Jacques Tran, Villejuif (FR)

(73) Assignee: MOBILE DEVICES INGENIERIE, Villejuif (FR)

( * ) Notice: Subject to any disclaimer, the term of this patent is extended or adjusted under 35 U.S.C. 154(b) by 111 days.

(21) Appl. No.: 14/003,049

(22) PCT Filed: Mar. 4, 2011

(86) PCT No.: PCT/IB2011/000792
§ 371 (c)(1),
(2), (4) Date: Sep. 4, 2013

(87) PCT Pub. No.: WO2012/120325
PCT Pub. Date: Sep. 13, 2012

(65) Prior Publication Data
US 2013/0345963 A1      Dec. 26, 2013

(51) Int. Cl.
*G01C 21/34*           (2006.01)
(52) U.S. Cl.
CPC ............ *G01C 21/3492* (2013.01); *G01C 21/34* (2013.01)

(58) Field of Classification Search
CPC .......................... G01C 21/3492; G01C 21/34
USPC ................. 701/420, 533, 467, 468, 465, 410
See application file for complete search history.

(56) References Cited

U.S. PATENT DOCUMENTS 6,812,888 B2 * 11/2004 Drury et al. .............. 342/357.31
7,451,042 B2 * 11/2008 Uyeki et al. .................. 701/423
7,672,778 B1    3/2010 Elliott

* cited by examiner

*Primary Examiner* — Thomas G Black
*Assistant Examiner* — Luke Huynh
(74) *Attorney, Agent, or Firm* — Frost Brown Todd LLC

(57) ABSTRACT

Navigation system and method comprising a server system with a navigation server (6) and a host server (7) connected to internet, having a first cartographic database (61) and a first routing engine, a mobile device (8) having geolocating means to determine a current location, having a second cartographic database (81) and a second routing engine, wherein the mobile device transmits a routing request to the remote server system, wherein the server system calculates a primary route (4) from the current location (3) to the destination point (2), said primary route comprising a list of maneuvering points each maneuvering point, wherein the server system calculates a list of waypoints located on the primary route, spaced away from the maneuvering points, the second routing engine establishing therefrom a secondary route (5), based on the waypoints and on the second cartographic database.

17 Claims, 4 Drawing Sheets

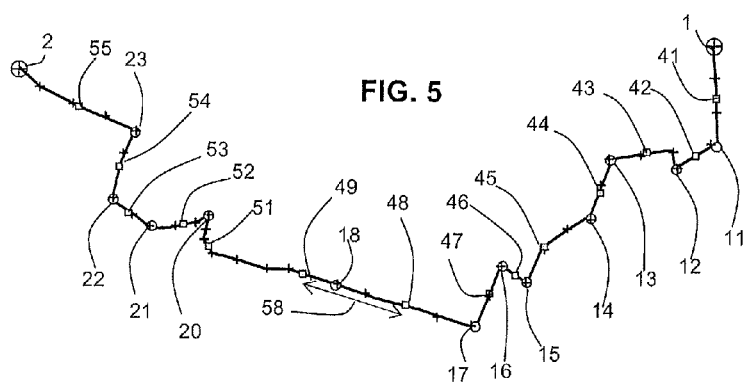
FIG. 5
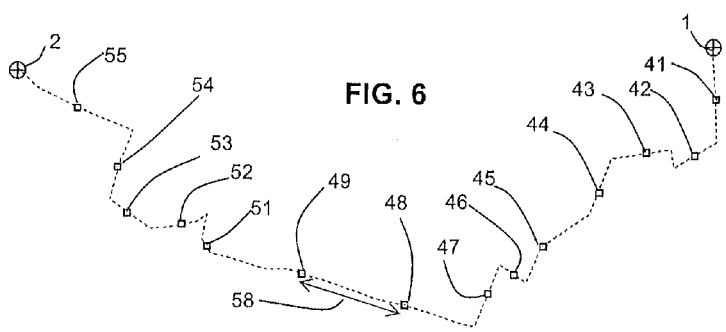
FIG. 6
FIG. 7
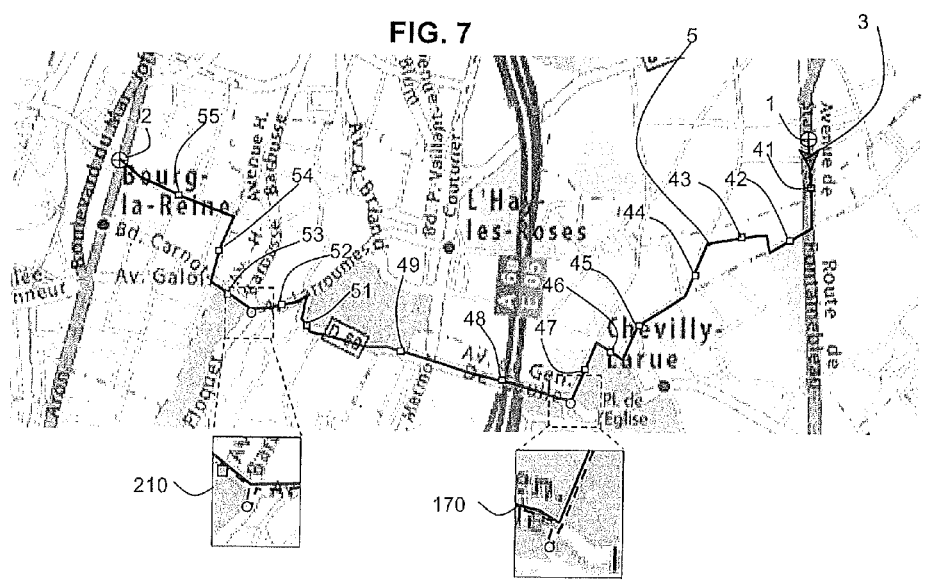

COMBINED OFFBOARD AND ONBOARD NAVIGATION SYSTEM AND METHOD

FIELD OF THE INVENTION

The present invention concerns navigation systems and methods, and especially combined 'offboard' and 'onboard' navigation systems and methods. An 'onboard' resource is provided in a mobile entity to be guided, and an 'offboard' resource is provided remotely from the mobile entity, for instance in internet servers.

BACKGROUND OF THE INVENTION

More precisely, the present invention concerns a method and system comprising:
  a server system connected to internet, having a first cartographic database and a first routing engine, adapted to calculate routes from starting points to destination points, taking into account traffic information,
  a mobile device wirelessly connected to the server system, having geolocating means to determine a current location, having a second cartographic database and a second routing engine,
  wherein said mobile device is adapted to determine a destination point, and to transmit a corresponding routing request to the remote server system,
wherein the server system is adapted to:
  calculate a primary route from the current location to said destination point, said primary route comprising a list of maneuvering points each maneuvering point comprising geo-coordinates and a maneuver to be performed.

Such method and system are known from U.S. Pat. No. 6,812,888. However, it may happen that the first (offboard) cartographic database exhibits some differences with regard to the second (onboard) cartographic database and the calculated primary route entails guidance errors on the mobile device, in particular nearby the maneuver points.

Such a problem is not handled by the prior art and there is a need to further optimize said combinations of offboard and onboard navigation systems and methods.

Moreover, regarding the Estimated Time of Arrival ('ETA') calculated by such a combination of offboard and onboard navigation systems and methods, the precision and update of ETA in the prior art disclosures is insufficient.

SUMMARY OF THE INVENTION

To this end, the present invention discloses a navigation system in which the server system is adapted to:
  calculate a list of waypoints, said waypoints being located on the primary route and spaced away from the maneuvering points,
  send this list of waypoints to the mobile device, and in that the second routing engine is adapted to establish a secondary route, from said current location to said destination point, based on the waypoints and on the second cartographic database.

The invention also concerns a navigation method, carried out by such navigation system comprising:
  a system server connected to internet, having a first cartographic database and a first routing engine, adapted to calculate routes from starting points to destination points, taking into account traffic information,
  a mobile device wirelessly connected to the server system, having geolocating means to determine a current location, having a second cartographic database and a second routing engine,
said navigation method comprising the following steps:
  a) a geolocating step wherein said mobile device determines its current location,
  b) a destination determination step wherein said mobile device determines a destination point,
  c) a routing requesting step wherein the mobile device transmits a routing request to the remote sever system,
  d) a calculating step wherein the server system calculates a primary route leading from said current location to said destination point, said primary route comprising a list of maneuvering points, each maneuvering point comprising geo-coordinates and a maneuver instruction to be performed,
  f) a waypoint calculating step wherein said server system calculates a list of waypoints, said waypoints being located on the primary route and spaced away from the maneuvering points,
  g) a waypoint sending step wherein the server system sends said list of waypoints to the mobile device,
  h) a secondary route establishing step wherein the second routing engine establishes a secondary route based on said waypoints and on second cartographic database.

Thanks to these dispositions, the secondary route is reconstructed consistently with the second cartographic database, based on the list of waypoints received from the host server.

In various embodiments of the invention for the system and/or for the method, one may possibly have recourse in addition to one and/or other of the following arrangements.

The server system comprises at least a navigation server, and at least a host server both connected to internet, wherein the navigation server is adapted to calculate said primary route from a current location to said destination point, and to send this primary route to the host server, wherein the host server is adapted to calculate a list of waypoints, said waypoints being located on the primary route and spaced away from the manoeuvring points, and to send this list of waypoints to the mobile device, the second routing engine being adapted to establish said secondary route. Thanks to these dispositions, the waypoints calculation can be performed by a dedicated server, in communication with mobile devices, and several navigation servers may be used by the navigation system, according to their availability or the cost of their services.

The list of waypoints comprises either 1 or 2 waypoints between two manoeuvring points; this limits the size of the file containing the list of waypoints.

Said waypoints are spaced away from crossroads; according to this aspect, errors that may occur in the vicinity of maneuvering point or crossroads may be avoided.

The navigation server is adapted to calculate, upon request of the host server, a schedule information including an estimated time of arrival at destination point and a list of estimated intermediate locations reached respectively within a list of time intervals from the current time, and wherein the navigation server is adapted to send this schedule information to the host server; this enables to give a reliable information regarding the estimated expected intermediate positions to the host server and further to the mobile device. It should be understood that this feature can be implemented independently of the waypoint calculating feature.

The host server is adapted to periodically track the position of the mobile device and to send again a request to the navigation server to require updated schedule information whenever the current position of the mobile device differs from an intermediate location after the corresponding time interval, of more than a predetermined distance; this enables the update of the schedule information in case the actual location differs too much from the expected location.

The schedule information comprises a list of time intervals including 5 min, 10 min, 15 min, 20 min, 25 min and 30 min; this enables to give a rather detailed short term expected locations.

BRIEF DESCRIPTION OF THE DRAWINGS

Other features and advantages of the invention appear from the following detailed description of one of its embodiments, given by way of non-limiting example, and with reference to the accompanying drawings.

In the drawings:

FIG. 5 shows the introduction of calculated waypoints, FIG. 6 shows the list of waypoints transmitted to a mobile device, FIG. 7 shows the construction of secondary route on the mobile device.

MORE DETAILED DESCRIPTION OF THE INVENTION

In the figures, the same references denote identical or similar elements.

Figure 1:
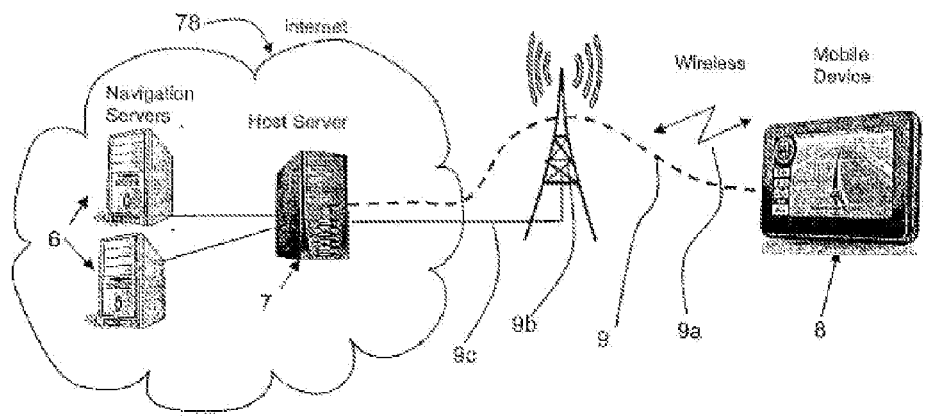
FIG. 1 is a schematic view of the navigation system according to the invention.

FIG. 1 shows a server system (6,7) comprising two navigation servers 6 and a host server 7 connected to internet 78, a mobile device 8 wirelessly connected to the server system thanks to a communication channel 9 having a wired portion 9c, a wireless portion 9a and a access point 9b.

The host server 7 and at least one navigation server 6 may form a single data processing unit, that can be designated as a server system (6,7) implementing both the functions of the navigation server 6 and the host server 7.

However, the following description and the relative drawings exemplify a case where the navigation server 6 and the host server 7 are separate machines.

The mobile device 8 may be for example a Personal Navigation Device ('PND'), or a smart phone; said mobile device 8 may be typically used in a vehicle, but can also be used by a pedestrian, a cyclist, or any transportation means. Said mobile device 8 comprises geolocating means to determine a current location of the mobile device 8, such as a GPS receiver or any other equivalent device.

Figure 2:
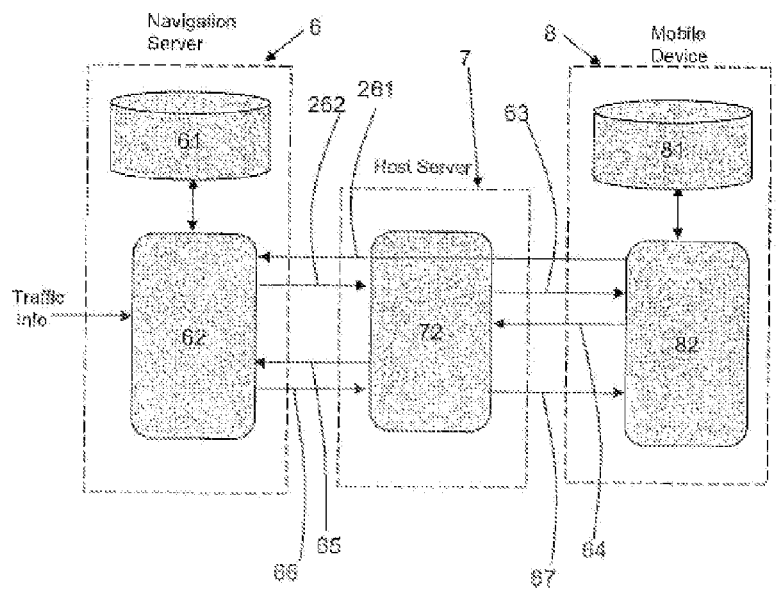
FIG. 2 is a functional diagram of the navigation system of FIG. 1.

Referring now to FIG. 2, the navigation server 6 comprises a first cartographic database 61 which is stored for example on high capacity hard disks or large memory spaces. Further, the navigation server 6 comprises a first routing engine 62, adapted to calculate routes from starting points to destination points. More precisely, the navigation server 6 is adapted to take into account traffic information either made available locally or received from specialized traffic information server.

The host server 7 comprises a computation module 72 whose functions will be detailed below. According to the present invention, the host server 7 does not require necessarily having a cartographic database neither a routing engine.

The host server 7 relies on one or more navigation server 6 to perform the complicated cartographic tasks. The host server 7 may choose the more appropriate navigation server 6 according to the geographic area in which travels the mobile device, or according to the current cost of the required service, whereby the use of different available navigation servers 6 may be optimized.

The mobile device 8 comprises a second cartographic database 81 which is stored locally for example on high capacity hard disks or any other memory devices. Further, the mobile device 8 comprises a second routing engine 82, adapted to calculate routes from starting points to destination points.

Regarding the mobile device 8, the local resources are referred to as 'onboard' resources, whereas the resources available at the remote end, i.e. in the navigation server are referred to as 'offboard' resources.

In practice, it may happen that the first (offboard) cartographic database 61 exhibits some differences with regard to the second (onboard) cartographic database 81 which can cause guidance errors when a calculated route is transferred from the navigation server 6 to the mobile device, in particular nearby the maneuvering points.

According to the invention, both 'offboard' resources and 'onboard' resources are used and combined together to decrease the risk of error.

Turning now to FIGS. 2-7, according to the invention, the method includes the following first steps:

a—) a geolocating step, wherein said mobile device 8 determines its current location 3, thanks to the already mentioned geolocating means, b—) a destination determination step, wherein said mobile device 8 determines a destination point 2, for example by a accepting a destination input from a user or by receiving a destination from a fleet management system, c—) a routing requesting step, wherein the mobile device transmits a routing request to the remote server system, in particular to the navigation server 6 through the host server 7 (arrow 261 in FIG. 2).

Of course, in step c—), the mobile device 8 could calculate locally a route from the current location to the destination location, but although the mobile device 8 may receive some traffic information, the navigation server 6 has usually more relevant and more up-to-date information. The navigation server 6 is also likely to be informed about the ongoing roadworks, the newly built road, the change of one way directions in some streets, etc. . . . .

Figure 3:
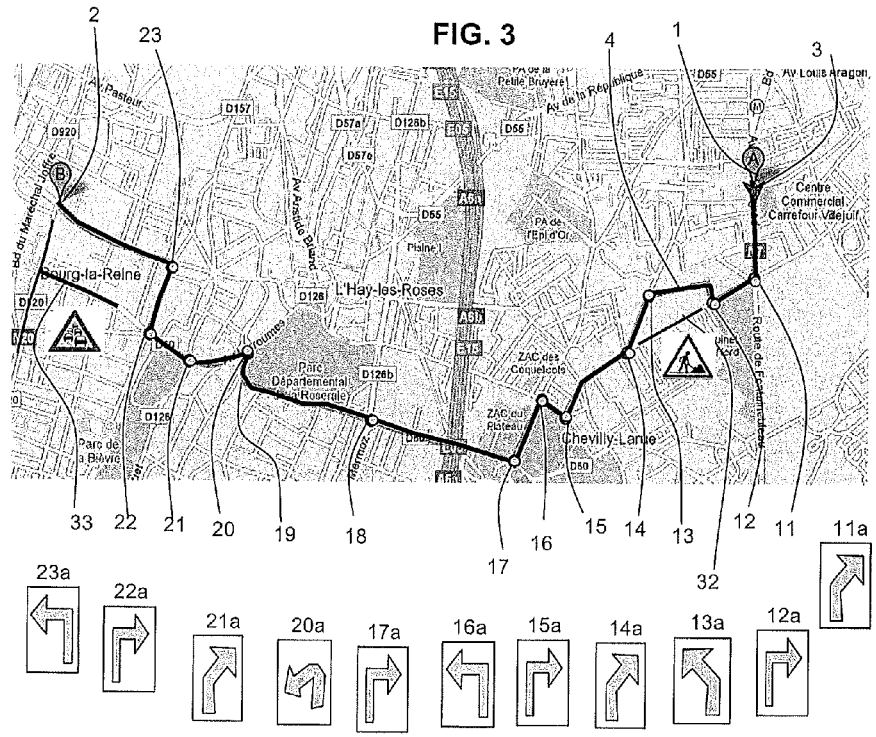
FIG. 3 shows a calculated primary route on the navigation server.

As illustrative examples on FIG. 3, the road segment 32 is closed for roadworks, and the road segment 33 exhibits a traffic congestion. The routing therefore must avoid these problematic segments.

Further, the method includes the following step:

d—) a calculating step, wherein the server system (particularly the navigation server 7) calculates a primary route 4 leading from said current location 1,3 to said destination point 2; said primary route comprises a list of maneuvering points (11-23), each maneuvering point comprising geo-coordinates and a maneuver instruction (11a-23a) to be performed.

Figure 4:
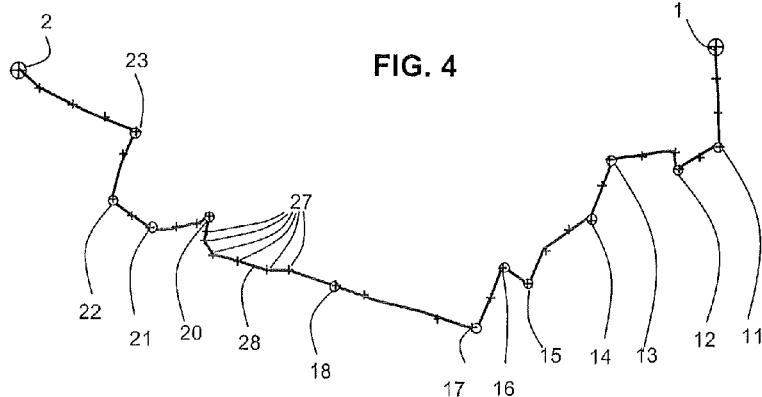
FIG. 4 shows the calculated primary route of FIG. 3 as taken on the host server.

The primary route comprises segments delimited by said maneuvering points (11-23), said segments are not necessarily rectilinear and may comprise intermediate points 27 to define the geometric shape of said segment, as shown by the small crosses 27 in FIG. 4 representing the calculated primary route 4, whereas the maneuvering points (11-23) are shown by small circles. A small route portion 28 comprised between two consecutive intermediate points 27 is known as a 'link'. Together with the maneuvering points (11-23) calculated in the primary route, each segment length between two consecutive maneuvering points (11-23) is also calculated, in particular thanks to the decomposition in links as mentioned just above.

Further, the method includes the following step, referring to FIG. 5:
  e—) a primary route transmitting step, in which the navigation server 6 transmits said primary route to the host server 7 (arrow 262 in FIG. 2), wherein this step e—) may be omitted when the host server 7 and the navigation server 6 form a single unit.
  f—) a waypoint calculating step, wherein said server system (particularly the host server 7) calculates a list of waypoints (41-55), said waypoints being located on the primary route 4 and spaced away from the maneuvering points (11-23).

Advantageously, the list of waypoints comprises either generally one or two waypoints between two maneuvering points; in some cases, there may be more than two waypoints between two maneuvering points. According to a further aspect, said waypoints are spaced away from crossroads. According to a further aspect, said waypoints are spaced away from one another. As shown on FIGS. 5 and 6, the waypoints are shown by small squares.

Further, optionally according to the present invention, the route lengths between two consecutive waypoints (see ref. 58 in FIGS. 5-6) are also calculated, thanks to the decomposition in 'links' as mentioned just above.

Further, the method includes the following step:
  g—) a waypoint sending step wherein the server system (particularly the host server 6) sends said list of waypoints to the mobile device 8 (see arrow 63 in FIG. 2);
  h—) a secondary route establishing step wherein the second routing engine 82 establishes a secondary route 5 based on said waypoints and on second cartographic database 81.

It is to be noted that the only the geo-coordinates need to be included in said list of waypoints, since the second routing engine is able to re-calculate the route (i.e. called secondary route) with the local resources. Therefore the list of waypoints represents a small size file which can be easily transmitted over a limited bandwidth wireless connection. However, optionally according to the present invention, the route lengths 58 between consecutive waypoints are also transmitted to the mobile device 8.

Referring to FIG. 7, the secondary route is re-constructed by the second routing engine consistently with the second cartographic database 81; it can be seen that the second cartographic database 81 may be different from the first cartographic database 61 depicted in FIG. 3, the precisions of the geo-coordinates may be different; For example, at maneuvering points 17 and 21, as their position is not accurate on the second cartographic database 81, the second routing engine would have made an error, which is illustrated in zoomed area 170 and 210 (FIG. 7).

The waypoints being located away from maneuvering points and also preferably away from crossroads, the risk or guiding error can therefore be reduced.

Figure 8:
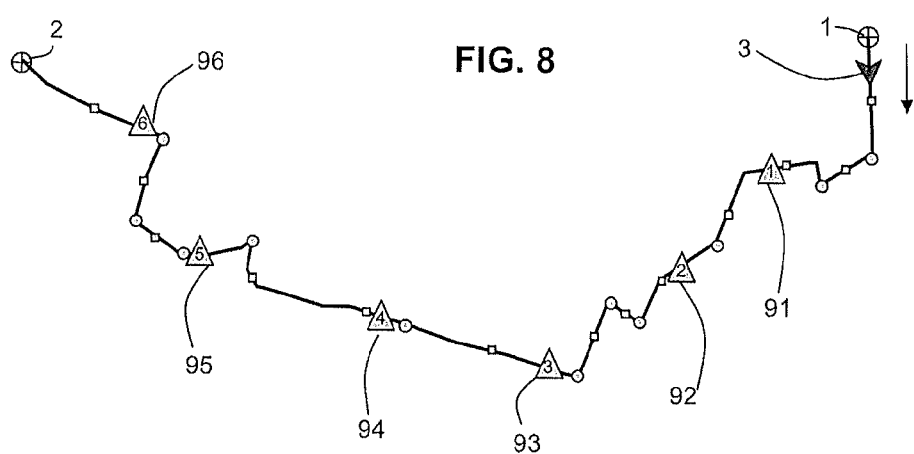
FIG. 8 illustrates part of the estimated time of arrival management.

According to another aspect of the invention, which can be implemented independently from the waypoints determination method, and referring to FIG. 8, the navigation server 6 may calculate, upon request of the host server 7 (see arrow 65 in FIG. 2), a schedule information including an estimated time of arrival (also known as 'ETA') at destination point 2 and a list of estimated intermediate locations reached respectively within a list of time intervals from the current time. The navigation server 6 sends this schedule information to the host server (see arrow 66 in FIG. 2).

Said list of time intervals includes for example the 5 min, 10 min, 15 min, 20 min, 25 min and 30 min time intervals. Of course, the list of time intervals can be parameterized to different values.

When calculating schedule information, the navigation server 6 can indeed take into account the average travel speed on each segment, the congestion factor on each segment and any other relevant information, whereby the accuracy of this information is improved.

Further, the navigation server 6 sends this schedule information to the host server 7. The estimated time of arrival ('ETA') is transmitted to the mobile device 8 to be displayed to the user. The estimated intermediate locations (91-96) reached respectively within a list of time intervals are illustrated by milestones on FIG. 8 shown by small triangles (91-96).

According to another aspect of the invention, the host server 7 can perform the following steps:
  periodically track the position of the mobile device 8 and, through the periodic reception from the mobile device 8 of its current location, (see arrow 64 in FIG. 2),
  send again a request to the navigation server 6 to require updated schedule information whenever the current position of the mobile device 8 differs from an intermediate location after the corresponding time interval, of more than a predetermined distance.

According to a further aspect of the invention, the host server 7 can ask the navigation server, on a periodic basis, whether the traffic conditions have significantly changed along the planned route; if the traffic conditions have significantly changed, the navigation server sends again the updated schedule information to the host server, and the latter forward the new ETA and the new list of estimated intermediate locations. The changes in the traffic conditions can be assessed with the variations of the 'congestion index' value as known in the art.

As a result, a new up-to-date ETA can be transmitted to the mobile device 8 to be displayed to the user said new up-to-date ETA taking into account the relevant traffic information data prevailing on the planned route.

Further, optionally according to the present invention, each the route length 58 between two consecutive waypoints is locally ('inboard') calculated in the mobile device 8 thanks to the second routing engine 82 and to the second cartographic database 81. The locally calculated length values 58 are then compared to the corresponding length values 58 received from the host server 7. In the case when two corresponding values differ too much, for example more than a predefined percentage, the mobile device 8 may require exceptionally additional waypoints to the host server 7; and consequently the host server 7 recalculate a new, more detailed, list of waypoints, regarding the concerned route segment, and sends this recalculated list of waypoints to the mobile device.

The invention claimed is:
1. Navigation system comprising:
  a server system connected to internet, having a first cartographic database and a first routing engine, adapted to calculate routes from starting points to destination points, taking into account traffic information,
  a mobile device wirelessly connected to the server system, having geolocating means to determine a current location, having a second cartographic database and a second routing engine, wherein the second cartographic database may exhibit differences with regard to the first cartographic database, wherein said mobile device is adapted to determine a destination point, and to transmit a corresponding routing request to the remote server system,
wherein the server system is adapted to:
   calculate a primary route from the current location to said destination point, said primary route comprising a list of maneuvering points each maneuvering point comprising geo-coordinates and a maneuver to be performed,
wherein the server system is adapted to:
   calculate a list of waypoints, said waypoints being located on the primary route and spaced away from the maneuvering points, the list of waypoints generally not including the maneuvering points,
   send this list of waypoints to the mobile device, and wherein the second routing engine is adapted to establish a secondary route, from said current location to said destination point, based on the waypoints and on the second cartographic database, without requiring the reception from the server system of maneuvering points or maneuver instructions or cartographic data, whereby only a limited bandwidth wireless connection is required between the mobile device and the server system.

2. Navigation system according to claim 1, wherein the server system comprises at least a navigation server, and at least a host server both connected to internet, wherein the navigation server is adapted to:
   calculate said primary route from a current location to said destination point,
   send this primary route to the host server, wherein the host server is adapted to:
   calculate a list of waypoints, said waypoints being located on the primary route and spaced away from the maneuvering points,
   send this list of waypoints to the mobile device, the second routing engine being adapted to establish said secondary route.

3. Navigation system according to claim 1, wherein the list of waypoints comprises either one or two waypoints between two maneuvering points.

4. Navigation system according to claim 1, wherein said waypoints are spaced away from crossroads.

5. Navigation system according to claim 2, wherein the navigation server is adapted to calculate, upon request of the host server, a schedule information including an estimated time of arrival at destination point and a list of estimated intermediate locations reached respectively within a list of time intervals from the current time, and wherein the navigation server is adapted to send this schedule information to the host server.

6. Navigation system according to claim 5, wherein the host server is adapted to:
   periodically track the position of the mobile device and,
   send again a request to the navigation server to require updated schedule information whenever the current position of the mobile device differs from an intermediate location after the corresponding time interval, of more than a predetermined distance.

7. Navigation system according to claim 5, wherein the host server is adapted to periodically send a request to the navigation server to know whether the traffic conditions have significantly changed along the planned route, and wherein if the traffic conditions have significantly changed, the navigation server is adapted to send again the updated schedule information to the host server.

8. Navigation system according to claim 5, wherein the schedule information comprises a list of time intervals selected from one or more of the following: 5 min, 10 min, 15 min, 20 min, 25 min and 30 min.

9. Navigation method carried out by a navigation system comprising:
   a system server connected to internet, having a first cartographic database and a first routing engine, adapted to calculate routes from starting points to destination points, taking into account traffic information,
   a mobile device wirelessly connected to the server system, having geolocating means to determine a current location, having a second cartographic database and a second routing engine, which does not require the reception from the server system of maneuvering points or cartographic data, wherein the second cartographic database may exhibit differences with regard to the first cartographic database, said navigation method comprising the following steps:
   a—) a geolocating step wherein said mobile device determines its current location,
   b—) a destination determination step wherein said mobile device determines a destination point,
   c—) a routing requesting step wherein the mobile device transmits a routing request to the remote server system,
   d—) a calculating step wherein the server system calculates a primary route leading from said current location to said destination point, said primary route comprising a list of maneuvering points, each maneuvering point comprising geo-coordinates and a maneuver instruction to be performed,
   f—) a waypoint calculating step wherein said server system calculates a list of waypoints, said waypoints being located on the primary route and spaced away from the maneuvering points, the list of waypoints generally not including the maneuvering points,
   g—) a waypoint sending step wherein the server system sends said list of waypoints to the mobile device,
   h—) a secondary route establishing step wherein the second routing engine establishes a secondary route based on said waypoints and on the second cartographic database, whereby only a limited bandwidth wireless connection is required between the mobile device and the server system.

10. Navigation method according to claim 9, wherein the server system comprises at least a navigation server, and at least a host server both connected to internet,
   wherein in the routing requesting step c), the routing request is sent to the navigation server via the host server,
   wherein the calculating step is performed by the navigation server,
   wherein the method further comprises the following step between steps d—) and f—):
   e—) a primary route transmitting step wherein the navigation server transmits said primary route to the host server,
   wherein the waypoint calculating step is performed by the host server,
   wherein the waypoint sending step is performed by the host server.

11. Navigation method according to claim 9, wherein the list of waypoints comprises either one or two to waypoints between two maneuver points.

12. Navigation method according to claim 9, wherein said waypoints are spaced away from crossroads.

13. Navigation method according to claim 9, comprising the additional steps of:
   the host server calculates and sends route lengths separating consecutive waypoints;
   the mobile device calculates locally route lengths separating consecutive waypoints thanks to the second routing engine and to the second cartographic database;
   the mobile device compares locally route lengths separating consecutive waypoints to route lengths received from the host server;
   the mobile device requires to the host server additional waypoints whenever the comparison shows a difference greater than a predefined value.

14. Navigation method according to claim 10, comprising the steps of:
   a time calculation step wherein the navigation server calculates, upon request of the host server, a schedule information including an estimated time of arrival at destination point and a list of estimated intermediate locations reached respectively within a list of time intervals from the current time,
   the navigation server sends this schedule information to the host server.

15. Navigation method according to claim 14, comprising the steps of:
   the host server periodically tracks the position of the mobile device,
   the host server sends again a request to the navigation server to require updated schedule information whenever the current position of the mobile device differs from an intermediate location after the corresponding time interval, of more than a predetermined distance.

16. Navigation method according to claim 14, comprising the steps of:
   the host server periodically sends a request to the navigation server to know whether the traffic conditions have significantly changed along the planned route,
   the navigation server sends again the updated schedule information to the host server whenever the traffic conditions have significantly changed.

17. Navigation method according to claim 14, wherein schedule information comprises a list of time intervals selected from one or more of the following: 5 min, 10 min, 15 min, 20 min, 25 min and 30 min.

* * * * *